Nov. 8, 1955　　　H. B. McCHESNEY, JR　　　2,723,131
PEDAL SCOOTER
Filed July 6, 1953　　　　　　　　　　　　　　2 Sheets-Sheet 1
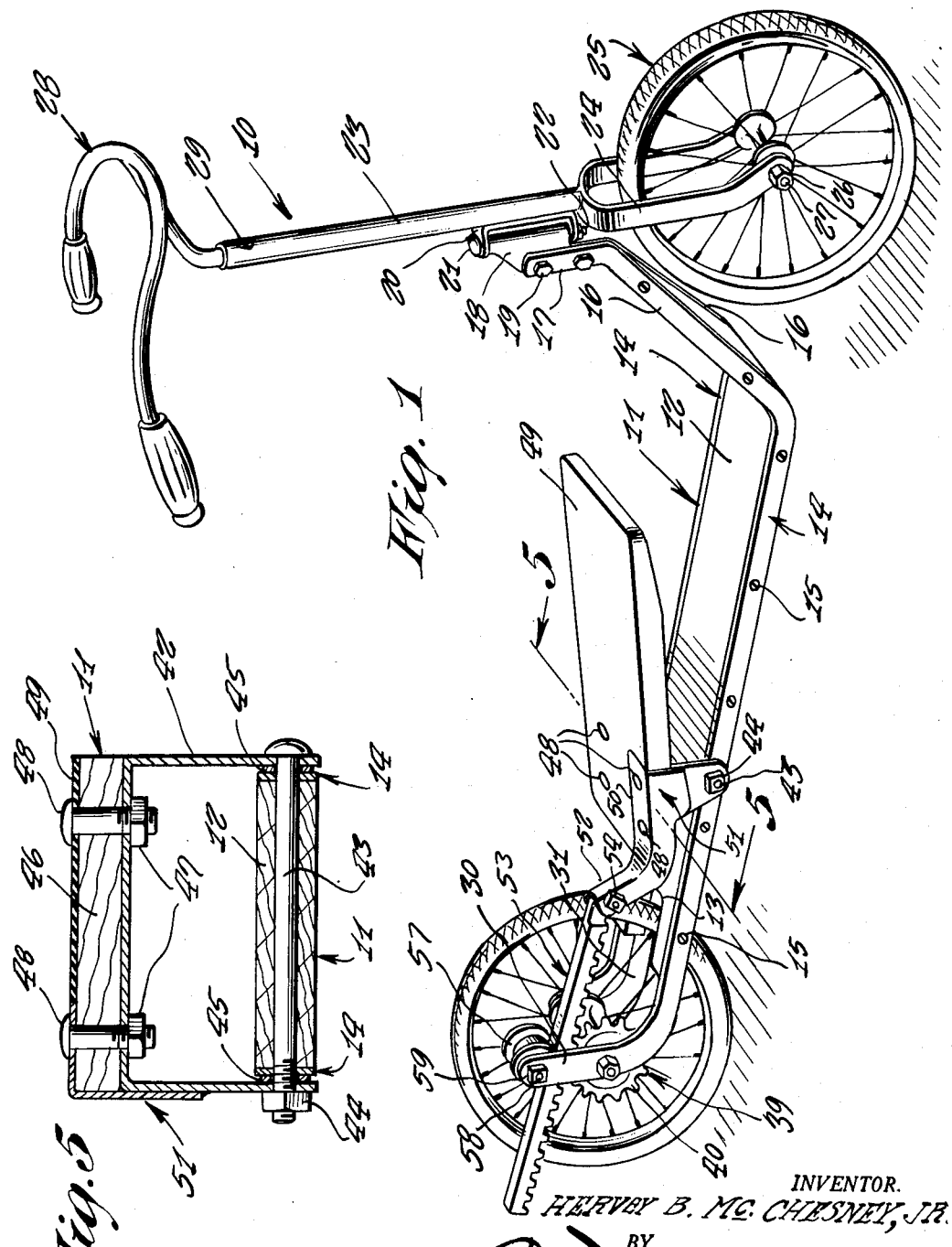
INVENTOR.
HERVEY B. McCHESNEY, JR.
BY
Carl Miller
ATTORNEY Nov. 8, 1955 H. B. McCHESNEY, JR 2,723,131
PEDAL SCOOTER
Filed July 6, 1953 2 Sheets-Sheet 2
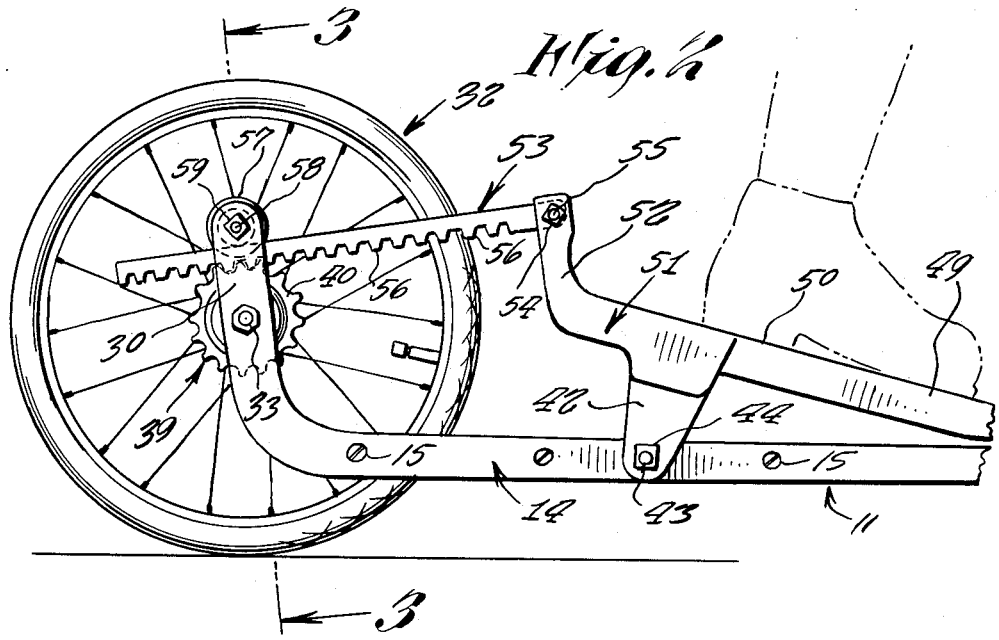
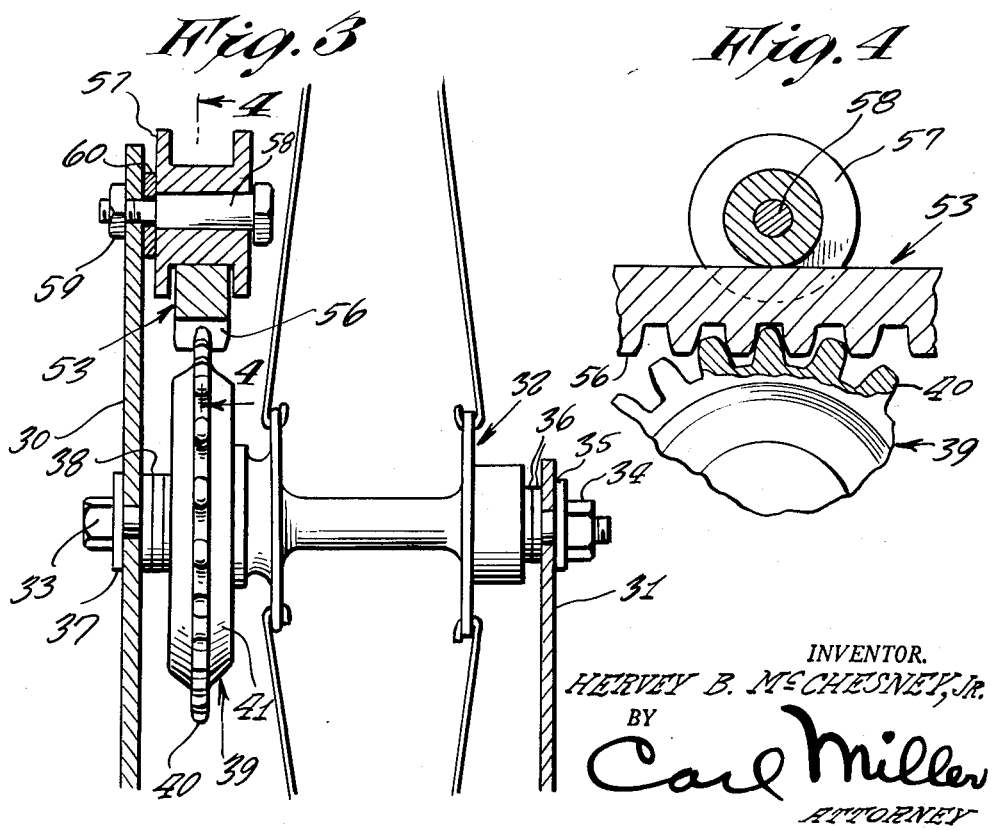
INVENTOR.
HERVEY B. McCHESNEY, JR.
BY Carl Miller
ATTORNEY United States Patent Office 2,723,131
Patented Nov. 8, 1955

2,723,131

PEDAL SCOOTER

Hervey B. McChesney, Jr., Bowling Green, Ky.

Application July 6, 1953, Serial No. 366,098

2 Claims. (Cl. 280—221)

This invention relates to pedal scooters.

It is an object of the present invention to provide a pedal scooter including a movable, pivoted platform which, when moved, will actuate the propelling mechanism.

It is another object of the present invention to provide a pedal scooter of the above type wherein the platform cooperates with a coaster mechanism, the platform propelling the scooter when pressed down forwardly and being out of clutch when pressed down rearwardly to assume its pre-propelling position.

Other objects of the present invention are to provide a pedal scooter bearing the above objects in mind which is of simple construction, has a minimum number of parts, is inexpensive to manufacture, is easy to use and efficient in operation.

For other objects and for a better understanding of the invention, reference may be had to the following detailed description taken in connection with the accompanying drawing, in which:

Fig. 1 is a perspective view of a pedal scooter embodying the features of the present invention with the platform shown in the pre-propelling position;

Fig. 2 is a fragmentary side elevational view thereof showing the platform in a post-propelling position;

Fig. 3 is a fragmentary vertical sectional view taken along line 3—3 of Fig. 2;

Fig. 4 is a fragmentary vertical sectional view taken along line 4—4 of Fig. 3 and Fig. 5 is a vertical sectional view taken along line 5—5 of Fig. 1.

Referring more in detail to the drawing, in which similar reference numerals identify corresponding parts throughout the several views, there is shown a pedal scooter, referred to collectively as 10, and including a body 11, substantially as illustrated.

The body 11 comprises a rectangular board 12 cut away as at 13 and supported along each longitudinal edge by steel strap members 14, the members 14 being secured to board 12 by screws 15.

The straps 14 extend forwardly of board 12, being bent upwardly and coming together as at 16 and terminating in vertical portions 17 which support a bearing member 18 by means of bolts 19, substantially as illustrated in Fig. 1.

A bracket 20 is pivotally mounted in bearing member 18 by means of a bolt 21 and nut 22, the bracket 20 being suitably secured to a hollow shaft 23 terminating at its lower portion in a bifurcated portion 24. The bifurcated portion 24 rotatably mounts the usual steering wheel 25 by means of a nut 26 and a bolt 27, suitable washers, not shown, being provided intermediate the nut 26, the head of bolt 27 and the adjacent portions of wheel 25.

Handle bar 28 is received within hollow shaft 23, and is secured therewithin in vertically adjustable position by means of set screw 29, permitting the scooter to be used by children of varying height.

The rear ends of frames 14 extend rearwardly of board 12 and cut-out portion 13 thereof to terminate in upwardly bent portions 30 and 31, the portion 30 extending upwardly beyond and parallel to the portion 31, as shown in Fig. 3.

A drive wheel 32 is rotatably mounted between portions 30 and 31 by means of a bolt 33 and nut 34, as shown in Fig. 3, washers 35—38 being suitably spaced on bolt 33 permitting the drive wheel 32 to rotate freely on bolt or axle 33.

A coaster mechanism 39 is provided intermediate drive wheel 32 and washers 38 and portion 30, as shown in Fig. 3, the mechanism 39 including the usual peripheral gear portion 40. Such coaster mechanisms are well known in the art and will not, therefore, be described in detail. Suffice it to say that movement of the gear portion 40 in a clockwise direction will drive the wheel 32 in a similar direction, while rotation of gear portion 40 in a counter-clockwise direction will occur independently of wheel 32. Such a mechanism may include a ratchet within the hollow portion 41 which rotates with the gear portion 40, and a spring urged pawl carried by the adjacent portion of wheel 32 within portion 41.

A pivotable bracket 42 straddles the straps 14, and is secured by means of a bolt 43 and a nut 44, suitable washers 45 being provided on bolt 43 intermediate straps 14 and bracket 42, as shown in Fig. 5.

A platform 46 is mounted on the back of bracket 42 by means of nuts and bolts 47 and 48, as shown in Fig. 5.

A rubber covering 49 is secured to the top of platform 46 by means of bolts 48 on one longitudinal side thereof, the other side of covering 49 being cut-away as at 50 and passing around the bolts 48 on the other longitudinal side.

An L-shaped bracket 51 fits over the board 46 in cut-out portion 50, and is secured thereto by means of the bolts 48, substantially as illustrated in Fig. 5, the rear end of bracket 51 continuing rearwardly and upwardly of the rear end of platform 46 in a three-sided, channel shaped portion 52, as shown best in Fig. 1.

A rake bar 53 is pivotally mounted at its forward end in the top of channel-shaped portion 52 by means of a nut 54 and bolt 55, suitable washers, not shown, being provided. Rake bar 53 is provided on its lower edge with teeth 56 which mesh with gear portion 40 of coaster mechanism 39, the upper edge of rake bar 53 being urged against gear portion 40 by a roller 57 rotatably mounted at the top of portion 30 by means of a bolt 58 and nut 59, a washer 60 being provided intermediate portion 30 and the roller, as shown in Fig. 3.

In operation, the child stands on platform 49 and grasps handle bar 28. To propel the scooter, the weight on platform 49 is shifted by moving the child's feet to bring the forward end of platform 49 down onto body 11, to the position shown in Fig. 2. This pulls rake bar 53 forward relative to portion 30 and rotates gear portion 40 in a clockwise manner, driving wheel 32 in the same direction through coaster mechanism 39. When the platform 49 reaches the position of Fig. 2, the child's weight is shifted back by moving the feet to bring the rear end of platform 49 down onto body 11, to the position of Fig. 1. This pushes rake bar 53 back to its original position, ready for the next propulsion. During the downward motion of the rear edge of platform 49 and the rearward displacement of rake bar 53, the gear portion 40 rotates in a counter-clockwise direction out of engagement with the wheel 32, permitting the child to coast during this rearward motion of rake bar 53. By a series of up and down movements of the above nature and sequence, the scooter will be propelled forward by the pivoted platform 49.

It should now be apparent that there has been provided a pedal scooter including a movable, pivoted platform which, when moved will actuate the propelling mechanism. It should also be apparent that there has been provided a pedal scooter of the above type wherein the platform cooperates with a coaster mechanism, the platform propelling the scooter when pressed down forwardly and being out of clutch when pressed down rearwardly to assume its pre-propelling position.

While various changes may be made in the detailed construction, it shall be understood that such changes shall be within the spirit and scope of the invention as defined by the appended claims.

Having thus set forth and disclosed the nature of my invention, what is claimed is:

1. A pedal scooter comprising a body having a steering wheel pivotally mounted at the front thereof and a drive wheel mounted at the rear thereof, a coaster mechanism in operative engagement with said drive wheel, said coaster mechanism having a peripheral gear portion, an operating member pivotally mounted on said body, an elongated rake bar adapted to mesh with said gear portion, means pivotally mounting the forward end of said rake bar on the rear end of said operating mechanism whereby downward motion of the forward end of said operating member will pull said rake bar forward and drive said gear portion, and roller means for maintaining said rake bar in operative mesh with said gear portion, said means pivotally mounting the forward end of said rake bar on the rear end of said operating member comprising an L-shaped bracket secured to one longitudinal side of said operating member at the rear thereof, said bracket continuing upwardly and rearwardly of said operating member in a three-sided, channel shaped member adapted to receive the end of said rake bar therebetween, and means pivotally mounting the forward end of said rake bar within said channel-shaped member.

2. A pedal scooter comprising a body, said body comprising an elongated, substantially rectangular member having a cut-out portion at its rear, and a pair of metal straps secured to said member along each longitudinal edge thereof, said straps continuing forwardly of said member in upwardly and inwardly extending portions, a steering wheel, means for pivotally mounting said steering wheel below and adjacent said upwardly and inwardly extending portions, said straps continuing rearwardly and upwardly of said member and terminating in vertical portions parallel to each other and transversely aligned, one of said vertical portions extending above the other of said vertical portions, a drive wheel mounted intermediate said vertical portions of said straps, a coaster mechanism mounted intermediate said vertical portions in operative engagement with said drive wheel, said mechanism including a peripheral gear portion, a three-sided rectangular bracket pivotally mounted at its ends on said straps above said rectangular member, an operating member fixedly mounted on the back of said bracket, an elongated rake bar adapted to mesh with said gear portion, an L-shaped bracket secured to one longitudinal side of said operating member and overlying said bracket, said bracket continuing upwardly and rearwardly of said operating member in a three-sided, channel shaped member adapted to receive the end of said rake bar therebetween, means pivotally mounting the forward end of said rake bar within said channel-shaped member, a roller rotatably mounted in the upper end of one of said vertical portions, said roller having a peripheral groove receiving therewithin the upper longitudinal edge of said rake bar.

References Cited in the file of this patent

UNITED STATES PATENTS

| | | |
|---|---|---|
| 1,601,249 | Hayden | Sept. 28, 1926 |
| 1,750,187 | Miller et al. | Mar. 11, 1930 |

FOREIGN PATENTS

| | | |
|---|---|---|
| 811,196 | Germany | Aug. 16, 1951 |
| 833,458 | Germany | Mar. 10, 1952 |
| 16,727 | Great Britain | 1915 |